Feb. 17, 1959  R. M. LICHTENSTEIN  2,874,304
IONIZATION CHAMBER
Filed March 31, 1955
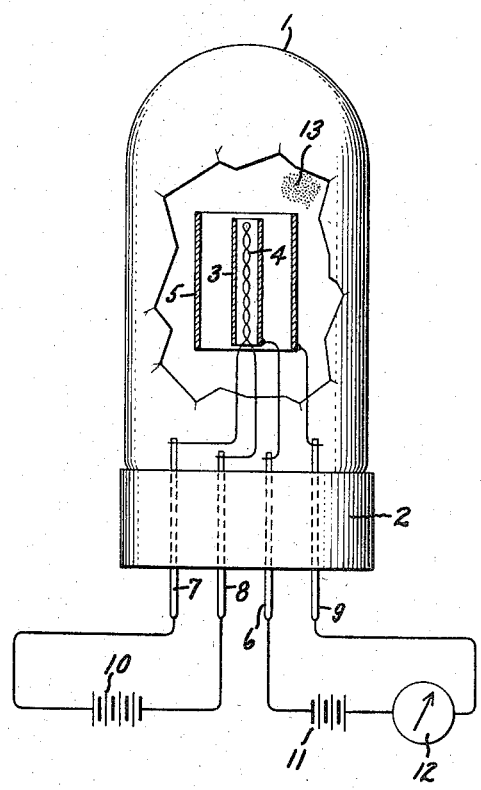
Inventor:
Roland M. Lichtenstein,
by Merton D. Moore
His Attorney.

United States Patent Office 2,874,304
Patented Feb. 17, 1959

2,874,304

IONIZATION CHAMBER

Roland M. Lichtenstein, Schenectady, N. Y., assignor to General Electric Company, a corporation of New York Application March 31, 1955, Serial No. 498,252

9 Claims. (Cl. 250—83.6)

This invention relates to the detection and measurement of penetrative radiation, and more particularly to a device of the ion chamber type for measuring the intensity of such radiation.

It is well known that a rapidly moving charged particle, such as an alpha or beta particle, has the ability to eject electrons from the atoms or molecules of a gas through which it passes. Some of the atoms or molecules of the gas are thus converted into positive and negative ions. It is also well known that the ionization of gases can also be effected by electromagnetic radiation, such as X-rays and gamma rays, since such radiation ejects electrons from atoms or molecules present in the gas and these rapidly moving, secondary electrons cause the gas to become ionized.

One simple device that utilizes the above principles and is widely used for the measurement of radiation intensity is the ion chamber. Such chambers usually comprise an electrode element such as a metal sleeve, and another electrode element such as a thin metal rod within the sleeve. A voltage is then applied between these elements and the chamber is filled with some suitable gas. The current collected by the electrodes, as a result of collecting ions produced by any radiation to which the chamber is subjected, is then measured by a suitable instrument. At usual radiation intensities, there is a very weak flow of electrical current between the electrodes, and an indicator such as a very sensitive electrometer or vacuum tube voltmeter is then used to measure the current; and the strength of the current will be directly proportional to the rate at which radiation is entering the ionization chamber. For further information concerning such ionization chambers, reference may be made to a text entitled, "Sourcebook on Atomic Energy," by Samuel Glasstone, published by the D. Van Nostrand Co., Inc., in 1950, chapter 6.

The output current of such an ionization chamber with a volume of approximately one liter and filled with air at a pressure of one atmosphere is about $0.6 \times 10^{-12}$ amperes when the radiation intensity being measured is equal to the maximum that a person can tolerate. This current is very small, and extremely delicate meters and amplifiers are needed for its detection. It is, therefore, desirable that one finds a way to increase the output current. This could be done by increasing the size of the ion chamber or by increasing the pressure of the gas within the chamber. Neither of these solutions is very attractive, since the former results in an unwieldy instrument and the latter does not provide a sufficient increase at safe pressures. The present invention makes it possible to increase the output current by a factor of as much as ten thousand without resorting to either of the above schemes, and permits the use of an ordinary galvanometer, for radiation intensities of the tolerance level, to provide an indication of radiation intensity. It also permits the use of a more rugged ammeter at higher radiation intensities.

It is, therefore, one object of this invention to provide an improved ionization chamber for measuring radiation intensity.

It is another object of this invention to provide an improved ionization chamber for measuring radiation intensity which makes it possible to increase greatly the output current previously obtained from ordinary ionization chambers.

It is a further object of this invention to provide an improved ionization chamber having an output current which can be measured with an ordinary galvanometer or ammeter.

Other objects and advantages will appear as the description of the invention proceeds.

Briefly stated, in accordance with the invention, the ordinary center electrode of an ionization chamber is replaced by an electron emitting cathode element, and a gas is disposed within the chamber which allows electrons to move freely therein. When the ionization chamber is exposed to radiation, its output current may be as much as ten thousand times that of an ordinary ionization chamber. Also, a small amount of a gas including large molecules therein may be added in order to increase still further the output current between the cathode and anode elements of the ionization chamber.

The features of this invention which are believed to be novel and patentable are pointed out in the claims which form a part of this specification. For a better understanding of the invention, reference is made in the following description to the accompanying drawing, wherein the sole figure shows a perspective view of an ionization chamber constructed in accordance with the invention, the anode and cathode elements being shown in cross section.

Referring now to the drawing, there is shown a hermetically sealed housing 1 containing the ionization chamber of the invention. This housing must be capable of being penetrated by radiation and may comprise an ordinary vacuum tube housing made of glass, or a metal housing with a thin window for admitting radiation therein. The housing has an electrical insulator base 2 at the bottom thereof. Disposed within housing 1 is an ionization chamber which comprises an electron emitting cathode element 3 having a heater filament wire 4 disposed therewithin, this combination of elements forming an indirectly heated, electron emitting cathode element. Cathode element 3 may have a cylindrical shape, although that is not necessary to the invention; and this cathode may be of the directly heated type, rather than of the indirect type shown in the figure. Also, this cathode element may be of the unheated photo-emissive type.

Surrounding cathode element 3, and forming the ionization chamber, is an anode element 5, which may also have a cylindrical shape and be disposed concentrically about the cathode element. The shape of the anode element also need not necessarily be cylindrical nor need this element necessarily be concentrically disposed around the cathode element.

Element 3 is supported by an electrically conductive wire leading to an electrically conductive pin 6, element 4 being supported by electrically conductive wires leading to electrically conductive pins 7 and 8, and element 5 being supported by an electrically conductive wire leading to an electrically conductive pin 9. Pins 6 to 9 are all imbedded in and pass through insulator base 2. Attached to pins 7 and 8 is a battery 10 for activating the heater filament 4 and causing the cathode element 3 to emit electrons. Battery 10 may have any value sufficient to cause the cathode element 3 to emit electrons, and may be replaced by an ordinary filament power supply.

Connected between pins 6 and 9 is a battery 11 connected in series with a current measuring device such as an ordinary galvanometer or ammeter 12. Battery 11, which may also comprise an electronic direct current power supply, is so connected that the anode element 5 is made positive relative to cathode element 3; and this battery has a voltage of a few volts, the voltage depending on the radiation level to be measured, and the size of the chamber. Battery 11 may be a ten-volt battery for an ionization chamber that is ten centimeters long and has an anode element with a radius of three centimeters, the chamber containing argon gas at atmospheric pressure.

Disposed within envelope 1, and hence within the ionization chamber formed by elements 3 and 5, is a gas indicated by a numeral 13. This gas should have an extremely high electron mobility coefficient (this coefficient being defined as the ratio of the drift velocity of an electron stream within the gas to the electric field strength in the gas). This is desirable in the present ionization chamber in order that the electrons may flow quickly and freely between the cathode and anode elements. Any of the noble gases, such as argon or neon, could be used in the ionization chamber of the present invention, since such gases have the requisite high electron mobility coefficient. The gas 13 may be under any suitable pressure, such as one atmosphere.

When no radiation is applied to the present ionization chamber, the voltage of battery 11 causes a current to flow between the cathode and anode elements. The magnitude of this current does not depend upon the emissivity of the filament, but is determined by space charge considerations. The voltages applied are such that no ionization can occur. Now the ionization chamber is exposed to radiation. Ionization of the gas within the chamber will occur and the positive ions, because of their low mobility, will greatly reduce the space charge of the electrons emitted by the cathode element 3. Thus, a larger current can be drawn between cathode element 3 and anode element 5. Specifically, with a gas having a high electron mobility coefficient such as argon, it is possible to obtain an increase of current in the chamber of approximately $10^4$ times the current drawn by an ordinary ionization chamber with a non-emitting filament. This current between elements 3 and 5 can be read upon galvanometer or ammeter 12 and serves to provide an indication of radiation to which the ionization chamber has been exposed.

By adding a trace of a gas with large molecules to the chamber, the mobility of the positive ions can be made even lower, provided that the positive charge of the positive ions of the main gas is easily transferred to the molecules of the added gas and that the electrons do not attach themselves to the molecules of this latter gas and form low mobility negative ions. Gases suitable for the purposes of this invention would be organic vapors such as ether or alcohol, since these gases meet all of the requirements set forth above.

It can be shown mathematically that a cylindrically heated cathode surrounded by an outer cylindrical anode and forming therewith an ionization chamber, the ionization chamber being filled with a gas having a high electron mobility, will produce an output current which is approximately $10^4$ times the current produced by an ionization chamber in which the cathode is not heated. In this connection, let us define the following symbols:

$l$ = length of the ionization chamber
$a$ = radius of cathode element 3
$b$ = radius of outer cylinder or anode element 5
$r$ = radius to any arbitrary point of interest
$\rho_e$ = space charge density of the electrons
$\rho_p$ = space charge density of the positive ions
$\mu_e$ = mobility of the eelctrons
$\mu_p$ = mobility of the positive ions
$j_e$ = current density of the electrons
$j_p$ = current density of the positive ions
$V(r)$ = potential at any radius $r$ of interest
$W$ = applied voltage
$J$ = total current across the chamber $\alpha$ = amount of charge separated per unit time per unit volume under the influence of the gamma rays $\epsilon$ = dielectric constant of the gas $\approx .885 \times 10^{-13} \frac{\text{amp sec}}{\text{cm. volt}}$ $R$ = abbreviation for $r\frac{dV}{dr}$ $Z$ = dynamic output impedance of the chamber All of the following equations are in volt-ampere units; currents are regarded as positive when flowing outward; and $\rho_e$ is negative, $\rho_p$ is positive.

We have the following two equations relating current density to charge density, mobility, and electric field strength. Diffusion due to concentration gradients is neglected here.

$$j_e = \rho_e \mu_e \frac{dV}{dr} \qquad (1)$$

$$j_p = -\rho_p \mu_p \frac{dV}{dr} \qquad (2)$$

The following two equations are continuity equations:

$$\text{div } j_e = -\alpha \qquad (3)$$
$$\text{div } j_p = +\alpha \qquad (4)$$

The next equation is the Poisson equation:

$$\text{div grad } V = -\frac{\rho_e + \rho_p}{\epsilon} \qquad (5)$$

In the cylindrical coordinates, $$\text{div } j_e = \frac{1}{r}\frac{d}{dr}(rj_e); \text{ div } j_p = \frac{1}{r}\frac{d}{dr}(rj_p) \qquad (6)$$

$$\text{div grad } V = \frac{1}{r}\frac{d}{dr}\left(r\frac{dV}{dr}\right) \qquad (7)$$

Combining (1) with (3), (2) with (4), and using (6) and (7) we get:

$$\frac{1}{r}\frac{d}{dr}\left(\rho_e r \frac{dV}{dr}\right) = -\frac{\alpha}{\mu_e} \qquad (8)$$

$$-\frac{1}{r}\frac{d}{dr}\left(\rho_p r \frac{dV}{dr}\right) = \frac{\alpha}{\mu_p} \qquad (9)$$

$$\frac{1}{r}\frac{d}{dr}\left(r\frac{dV}{dr}\right) = -\frac{\rho_e + \rho_p}{\epsilon} \qquad (10)$$

(8), (9), (10) are the fundamental equations regulating the behavior of the device.

With the abbreviation $$r\frac{dV}{dr} = R$$

Equations 8, 9, 10 become $$\frac{d}{dr}(\rho_e R) = -\frac{\alpha}{\mu_e}r \qquad (11)$$

$$\frac{d}{dr}(\rho_p R) = -\frac{\alpha}{\mu_p}r \qquad (12)$$

$$\frac{dR}{dr} = -\frac{1}{\epsilon}(\rho_e + \rho_p)r \qquad (13)$$

Integration of (11) and (12) gives $$\rho_e R = -\frac{\alpha}{\mu_e}\frac{r^2}{2} + A_e \qquad (14)$$

$$\rho_p R = -\frac{\alpha}{\mu_p}\frac{r^2}{2} + A_p \qquad (15)$$

where $A_e$ and $A_p$ are integration constants.

Multiplying (13) by R gives $$R\frac{dR}{dr} = \frac{1}{2}\frac{dR^2}{dr} = -\frac{1}{\epsilon}(\rho_e R + \rho_p R)r \qquad (16)$$

Inserting (14) and (15) into (16) gives $$\frac{1}{2}\frac{dR^2}{dr}=\frac{r}{\epsilon}\left[\alpha\frac{r^2}{\mu_e}\frac{1}{2}+\frac{\alpha}{\mu_p}\frac{r^2}{2}-A_e-A_p\right]$$

or $$\frac{dR^2}{dr}=\frac{\alpha}{\epsilon}\left(\frac{1}{\mu_e}+\frac{1}{\mu_p}\right)r^3-2\frac{(A_e+A_p)}{\epsilon}r \quad (17)$$

Integration gives $$R^2=\frac{\alpha}{4\epsilon}\left(\frac{1}{\mu_e}+\frac{1}{\mu_p}\right)r^4-\frac{A_e+A_p}{\epsilon}r^2+B \quad (18)$$

where B is an integration constant. With $$r\frac{dV}{dr}=R$$

we get $$\frac{dV}{dr}=\left(\frac{\alpha}{4\epsilon}\left(\frac{1}{\mu_e}+\frac{1}{\mu_p}\right)r^2-\frac{A_e+A_p}{\epsilon}+\frac{B}{r^2}\right)^{1/2} \quad (19)$$

We now have to determine the integration constants $A_e$, $A_p$, $B$. The positive ion charge density should vanish at the outer cylinder ($r=b$). This, from (15), gives $$A_p=\frac{\alpha}{\mu_p}\frac{b^2}{2} \quad (20)$$

$$\frac{dV}{dr}$$

should vanish at the surface of the filament ($r=a$), for if $$\frac{dV}{dr}$$

were positive, we would draw off as many electrons as the filament can emit; and thus we would no longer operate in the space-charge limited condition. If, on the other hand, $$\frac{dV}{dr}$$

were negative, all electrons would be pushed back into the filament, provided that we can neglect the thermal velocity of the electrons; and this we do.

From (19) we then get $$B=a^2\frac{A_e+A_p}{\epsilon}-a^4\frac{\alpha}{4\epsilon}\left(\frac{1}{\mu_e}+\frac{1}{\mu_p}\right)$$

If we assume that the filament is very (in the limit, infinitely) thin, we get $$B=0 \quad (21)$$

Thus (19) becomes $$\frac{dV}{dr}=\left(\frac{\alpha}{4\epsilon}\left(\frac{1}{\mu_e}+\frac{1}{\mu_p}\right)r^2-\frac{A_e+A_p}{\epsilon}\right)^{1/2} \quad (22)$$

The remaining constant $A_e$ is determined from the condition that $$\int_0^b \frac{dV}{dr}dr=W$$

where W is the applied voltage. The total current J (counted positive) drawn by the chamber is given by $$J=-2\pi rl(j_e+j_p) \quad (23)$$

We have from (1) and (2)

$$J=-2\pi l\left(\mu_e\rho_e\frac{dV}{dr}-\mu_p\rho_p r\frac{dV}{dr}\right)$$

$$=-2\pi l(\mu_e\rho_e R-\mu_p\rho_p R)$$

and with (14), (15)

$$J=-2\pi l\left(-\alpha\frac{r^2}{2}+\mu_e A_e+\alpha\frac{r^2}{2}-\mu_p A_p\right)$$

or $$J=2\pi l(\mu_p A_p-\mu_e A_e) \quad (24)$$

Solving for $A_e$ gives $$A_e=\frac{\mu_p}{\mu_e}A_p-\frac{J}{2\pi l\mu_e}$$

Thus $$A_e+A_p=\mu_p\left(\frac{1}{\mu_e}+\frac{1}{\mu_p}\right)A_p-\frac{J}{2\pi l\mu_e}$$

and with (20)

$$A_e+A_p=\frac{\alpha b^2}{2}\left(\frac{1}{\mu_e}+\frac{1}{\mu_p}\right)-\frac{J}{2\pi l\mu_e} \quad (25)$$

Inserting this into (22) we get $$\frac{dV}{dr}=\left(\frac{\alpha}{4\epsilon}\left(\frac{1}{\mu_e}+\frac{1}{\mu_p}\right)r^2-\frac{\alpha}{2\epsilon}\left(\frac{1}{\mu_e}+\frac{1}{\mu_p}\right)b^2+\frac{J}{2\pi l\mu_e\epsilon}\right)^{1/2}$$

or $$\frac{dV}{dr}=\left(\frac{J}{2\pi l\mu_e\epsilon}-\frac{\alpha}{4\epsilon}\left(\frac{1}{\mu_e}+\frac{1}{\mu_p}\right)(2b^2-r^2)\right)^{1/2} \quad (26)$$

and with $$\int_0^b \frac{dV}{dr}dr=W$$

$$W=\int_0^b\left(\frac{J}{2\pi l\mu_e\epsilon}-\frac{\alpha}{4\epsilon}\left(\frac{1}{\mu_e}+\frac{1}{\mu_p}\right)(2b^2-r^2)\right)^{1/2}dr \quad (27)$$

This is the equation from which we can determine the current J in terms of the applied voltage W and the ionization density $\alpha$.

Let us ask how much the current J increases as we increase the ionization density $\alpha$ under the condition that the applied voltage is held constant; i. e. we would like to find $$\frac{dJ}{d\alpha} \text{ for } \frac{dW}{d\alpha}=0$$

Differentiating W in (27) with respect to $\alpha$ and equating the derivative to zero gives us $$0=\int_0^b \frac{1}{2}\left(\frac{J}{2\pi l\mu_e\epsilon}-\frac{\alpha}{4\epsilon}\left(\frac{1}{\mu_e}+\frac{1}{\mu_p}\right)(2b^2-r^2)\right)^{-1/2}\left(\frac{1}{2\pi l\mu_e\epsilon}\frac{dJ}{d\alpha}-\frac{1}{4\epsilon}\left(\frac{1}{\mu_e}+\frac{1}{\mu_p}\right)(2b^2-r^2)\right)dr$$

For the particular case $\alpha=0$, i. e. for weak radiation intensities, this leads to $$\frac{b}{2\pi l\mu_e\epsilon}\frac{dJ}{d\alpha}-\frac{1}{4\epsilon}\left(\frac{1}{\mu_e}+\frac{1}{\mu_p}\right)\left(2b^3-\frac{b^3}{3}\right)=0$$

or $$\frac{dJ}{d\alpha}=\frac{5}{6}\left(1+\frac{\mu_e}{\mu_p}\right)\pi b^2 l \quad (28)$$

(28) leads to $$J\approx J_0+\frac{5}{6}\left(1+\frac{\mu_e}{\mu_p}\right)\pi b^2 l\alpha \quad (29)$$

where $J_0$ is the current drawn in the absence of radiation. Now $$\pi b^2 l\alpha=I$$

where I is the current drawn by the device when operated as an ordinary ionization chamber. Thus $$\Delta J=J-J_0=\frac{5}{6}\left(1+\frac{\mu_e}{\mu_p}\right)I \quad (30)$$

The gain factor is $$\frac{5}{6}\left(1+\frac{\mu_e}{\mu_p}\right)$$

and it may run as high as $10^4$ or more.

From Equation 30, it will be apparent that the disclosed ionization chamber will produce an output current that is in the order of ten thousand times greater than that produced by the ionization chambers previously known in the art. Moreover, by adding a trace of a gas having large molecules to the gas in the ionization chamber, this can be increased still further. The present ionization chamber, therefore, makes it unnecessary to use vacuum tube voltmeters or amplifiers with ionization chambers and permits the use of ordinary galvanometers and ammeters.

Another interesting characteristic of the ion chamber of the present invention is its dynamic output impedance $Z$. It is given by $$Z=\frac{\partial W}{\partial J}$$

for constant $\alpha$.

From (27), $$Z=\int_0^b \frac{1}{2}\left(\frac{J}{2\pi l \mu_e \epsilon}-\frac{\alpha}{4\epsilon}\left(\frac{1}{\mu_e}+\frac{1}{\mu_p}\right)(2b^2-r^2)\right)^{-1/2}\frac{1}{2\pi l \mu_e \epsilon}dr \quad (31)$$

For weak radiation $\alpha \to 0$, and we get $$Z=\frac{1}{2}\sqrt{\frac{J}{2\pi l \mu_e \epsilon}}\,\frac{b}{2\pi l \mu_e \epsilon}=\frac{b}{2J}\sqrt{\frac{J}{2\pi l \mu_e \epsilon}} \quad (32)$$

On the other hand for $\alpha \to 0$, (27) becomes $$W=b\sqrt{\frac{J}{1\pi l \mu_e \epsilon}} \quad (33)$$

Combining (32) and (33) we get $$Z=\frac{1}{2}\frac{W}{J} \quad (34)$$

i. e. the dynamic output impedance is one half times the static impedance $$\frac{W}{J}$$

Let us calculate some representative values based on $W=10$ volt
$b=3$ cm.
$l=10$ cm.

$$\mu_e \approx 10^4 \frac{\text{cm.}^2}{\text{volt sec.}}\text{ for argon at atmospheric pressure}$$

$$\epsilon = .885 \times 10^{-13} \frac{\text{amp sec.}}{\text{cm. volt}}$$

From (33)

$$J=\frac{2\pi l \mu_e \epsilon W^2}{b^2}=.62 \cdot 10^{-6}\text{ amp.}$$

(34) then gives $$Z=8 \cdot 10^6 \text{ ohm}$$

This is quite low. The voltage signal that we could get from such a chamber could not exceed $Z\Delta J$. From (30), $$Z\Delta J=8\cdot 10^6\text{ ohm}\cdot\frac{5}{6}\left(1+\frac{\mu_e}{\mu_p}\right)I \approx$$
$$8\cdot 10^6 \text{ ohm} \cdot 10^4 I \approx 10^{11}\text{ ohm}\cdot I \quad (35)$$

Now an ordinary ionization chamber can send its output current through a $10^{11}$ ohm resistor, and the voltage drop across the resistor can be measured with a vacuum tube voltmeter. Therefore, (35) shows another distinct advantage of the present invention over ordinary ion chambers, since the higher output current of the invention makes it possible to use a $10^7$ ohm resistor and obtain the same output voltage. By operating the invention at lower impedance levels, the requirements on insulation and amplifier input tubes are reduced, and an ordinary galvanometer can be used since its impedance is approximately matched by that of the invention.

It should be understood that the present invention is not limited to any particular type of electron emitting cathode element, since suitable elements could be either directly or indirectly heated, or even unheated, photoemissive cathodes.

Further, the present invention is not limited to any particular size or shape of the cathode and anode elements. Although the shape of these elements was performed to be cylindrical for ease of calculation, other shapes would still provide a considerable improvement over the ionization chambers known in the art and such modifications will readily occur to those skilled in the art.

Nor is the present invention limited to any particular gas or combination of gases, since any gas having a high electron mobility factor could be used as the main gas in the ionization chamber, and any gas having large molecules to which electrons do not readily attach themselves could be used to provide the gas trace which enables an even greater amplification to be achieved in the ion chamber.

While there has been described what is at present considered a preferred embodiment of the invention, it will be obvious to those skilled in the art that various changes and modifications may be made therein without departing from the invention, and it is aimed by the appended claims to cover all such changes and modifications as fall within the true spirit and scope of the invention.

What I claim as new and desire to secure by Letters Patent of the United States is:

1. An ionization chamber for measuring radiation intensity comprising, heated cathode means for emitting electrons, anode means surrounding said cathode means and forming therewith an ionization chamber into which an external radiation may penetrate, voltage means connected in series with current reading means, the series combination of the latter two elements being connected between said anode and cathode means to make said anode means positive relative to said cathode means and causing an electrical current to flow between said cathode and anode means, and a gas within said chamber having an extremely high electron mobility coefficient, said gas being ionized by said external radiation and thereby increasing the flow of current between said cathode and anode means, said current reading means measuring the flow of electrical current between said cathode and anode means and thereby measuring the intensity of any external radiation to which the ionization chamber may have been subjected.

2. An ionization chamber for measuring radiation intensity comprising, a hermetically sealed envelope through which external radiation may penetrate, heated cathode means disposed within said envelope for emitting electrons, anode means surrounding said cathode means and disposed within said envelope and forming therewith an ionization chamber into which an external radiation may penetrate, voltage producing means connected in series with current reading meter means, the series combination being connected between said anode and cathode means to make said anode means positive relative to said cathode means and causing an electrical current to flow between said cathode and anode means, and a noble gas under pressure disposed within said envelope and allowing electrons to move freely therewithin, said gas being ionized by said external radiation and thereby increasing the flow of current between said cathode and anode means, said meter means measuring the flow of electrical current between said cathode and anode means and thereby measuring the intensity of any external radiation to which the ionization chamber may have been subjected.

3. An ionization chamber for measuring radiation intensity comprising, a hermetically sealed envelope through which external radiation may penetrate, heated cathode means disposed within said envelope for emitting electrons, anode means surrounding said cathode means and disposed within said envelope and forming therewith an ionization chamber into which an external radiation may penetrate, voltage producing means connected in series with current reading meter means, the series combination being connected between said anode and cathode means to make said anode means positive relative to said cathode means and causing an electrical current to flow between said cathode and anode means, a noble gas under pressure disposed within said envelope and allowing electrons to move freely therewithin, said gas being ionized by said external radiation and thereby increasing the flow of current between said cathode and anode means, said meter means measuring the flow of electrical current between said cathode and anode means and thereby measuring the intensity of any external radiation to which the ionization chamber may have been subjected, and a trace of an organic vapor within said envelope having large molecules to which electrons do not readily attach themselves for further increasing the flow of electrical current between said cathode and anode means.

4. An ionization chamber for measuring radiation intensity comprising, a hermetically sealed envelope through which external radiation may penetrate, heated cathode means disposed within said envelope for emitting electrons, anode means surrounding said cathode means and disposed within said envelope and forming therewith an ionization chamber into which an external radiation may penetrate, voltage producing means connected in series with current reading meter means, the series combination being connected between said anode and cathode means to make said anode means positive relative to said cathode means and causing an electrical current to flow between said cathode and anode means, argon gas under pressure disposed within said envelope and allowing electrons to move freely therewithin, said gas being ionized by said external radiation and thereby increasing the flow of current between said cathode and anode means, said meter means measuring the flow of electrical current between said cathode and anode means and thereby measuring the intensity of any external radiation to which the ionization chamber may have been subjected, and a trace to either within said envelope for reducing the mobility of any positive ions formed within the ionization chamber when it is subjected to radiation and for further increasing the flow of electrical current between said cathode and anode means.

5. An ionization chamber for measuring radiation intensity comprising, cathode means for emitting an electron stream the magnitude of which is limited by space charge effects, anode means adjacent said cathode means and forming therewith an ionization chamber into which an external radiation may penetrate, a gas within said chamber having an extremely high electron mobility coefficient, said gas being ionized by said external radiation whereby space charge effects are neutralized and a large electron current flow between said anode and cathode occurs.

6. An ionization chamber for measuring radiation intensity comprising, cathode means for emitting an electron stream the magnitude of which is limited by space charge effects, anode means adjacent said cathode means and forming therewith an ionization chamber into which an external radiation may penetrate, a gas within said chamber having an extremely high electron mobility coefficient, said gas being ionized by said external radiation whereby space charge effects are neutralized and a large electron current flow between said anode and cathode occurs, and a trace of a gas within said chamber having large molecules therein to which electrons do not readily attach themselves for further increasing the flow of electron current between said cathode and anode means.

7. An ionization chamber for measuring radiation intensity comprising, cathode means for emitting an electron stream the magnitude of which is limited by space charge effects, anode means adjacent to said cathode means and forming therewith an ionization chamber into which an external radiation may penetrate, voltage means for making said anode means positive relative to said cathode means, a gas within said chamber having an extremely high electron mobility coefficient, said gas being ionized by said external radiation whereby space charge effects are neutralized and a large current flow between said anode and cathode occurs.

8. An ionization chamber for measuring radiation intensity comprising, cathode means for emitting an electron stream the magnitude of which is limited by space charge effects, anode means adjacent to said cathode means and forming therewith an ionization chamber into which an external radiation may penetrate, voltage means for making said anode means positive relative to said cathode means, a gas within said chamber having an extremely high electron mobility coefficient, said gas being ionized by said external radiation whereby space charge effects are neutralized and a large electron current flow between said anode and cathode occurs, and a trace of a gas within said chamber having large molecules therein to which electrons do not readily attach themselves for further increasing the flow of electron current between said cathode and anode means.

9. An ionization chamber characterized by the utilization of an electron stream as the measuring parameter comprising, means for producing a stream of electrons space charged limited in the absence of radiation, means for controlling the electron stream in response to impinging radiation including a gas of high electron mobility which is ionized by radiation to neutralize the space charge whereby electron current flow is increased as an index of the radiation intensity.

References Cited in the file of this patent

UNITED STATES PATENTS

| | | |
|---|---|---|
| 2,141,655 | Kott | Dec. 27, 1938 |
| 2,479,201 | Bleeksma | Aug. 16, 1949 |
| 2,502,331 | Malter | Mar. 28, 1950 |